Dec. 30, 1958 R. P. KOEHRING 2,866,886

METHOD OF MANUFACTURE

Filed Oct. 24, 1956

INVENTOR.
ROLAND P. KOEHRING
BY
HIS ATTORNEY

United States Patent Office 2,866,886
Patented Dec. 30, 1958

2,866,886

METHOD OF MANUFACTURE

Roland P. Koehring, Dayton, Ohio, assignor to General Motors Corporation, Detroit, Mich., a corporation of Delaware Application October 24, 1956, Serial No. 617,983

6 Claims. (Cl. 219—117)

This invention relates to a welding method and is particularly concerned with the method for welding a friction layer of porous ferrous material, including a high percentage of graphite therein, to a strong metal supporting member.

It is, therefore, an object of this invention to provide a resistance welding method for bonding a friction layer or element of a normally brittle porous ferrous material, including high percentages of graphite therein, to an iron or steel supporting member such as a brake or clutch element.

In carrying out the above object, it is a further object of the invention to utilize the difference in resistance between portions of the porous ferrous friction layer to promote differential temperature conditions to prevail at the interface between the friction layer and the supporting member whereby portions at the interface attain welding temperatures while a remainder of the friction element is maintained below said welding temperatures.

This condition is accomplished through the specific structure of the friction member or element which comprises a porous sintered ferrous network wherein graphite and other friction fortifying materials are present within the porous ferrous structure. Thus, the porous ferrous structure presents an interrupted surface at the interface and also presents a multiplicity of low resistance metallic paths for the welding current to traverse. Substantially, uniformly dispersed within the porous ferrous structure are the graphite inclusions which present high resistance toward electrical flow. In this manner, the temperatures of the ferrous portions at the interface are maintained at substantially higher temperatures than the remainder of the part.

For purposes of description, the porous ferrous friction element used in the present welding method is one of the type generally described in copending applications, S. N. 540,842, filed October 17, 1955, and S. N. 596,266, filed July 6, 1956, both assigned to the assignee of the present invention and copending herewith.

Prior art practices used in the bonding of the friction element of this character to a supporting member have been directed to furnace bonding wherein the friction layer is juxtaposed upon the supporting element and the two are maintained in pressure relation to one another and are then heated to a temperature sufficient to cause the bond to form, for example, above 1900° F. It is apparent that this type of bonding operation requires overall heating for an extended time.

In resistance welding operations, as set forth herein, the entire welding step is completed within a period of from one-half to two and one-half minutes and the temperature reached by the major portion of the friction element is well below the bonding or welding temperature.

Further objects and advantages of the present invention will be apparent from the following description, reference being had to the accompanying drawings wherein preferred embodiments of the present invention are clearly shown.

Figure 1:
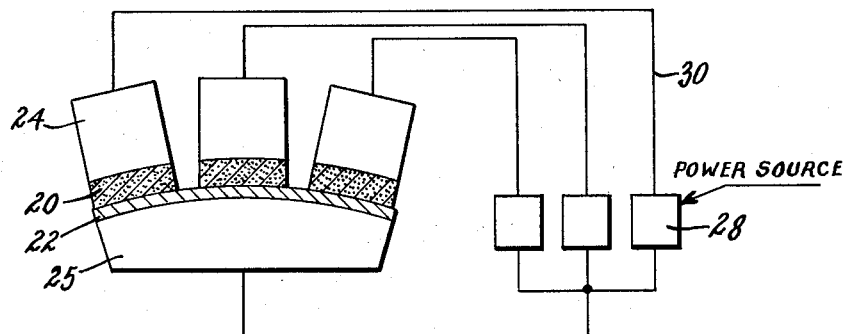
Figure 1 is a diagrammatic view of one type of resistance welding operation wherein a plurality of separate pads of friction material are welded to a supporting element.

In the present procedure, a resistance welding transformer is used which is connected electrically with pressure electrodes preferably of copper, graphite faced, wherein the area of the electrode is the same or slightly greater than the area to be welded. The parts to be welded are pressed between two electrodes and pressure is applied in the order of 150 pounds per square inch to hold the parts in intimate coextensive relation to one another. A current from a power source is then passed through the electrodes and the parts to be welded. It has been found that a current of about 600 amperes per square inch forms suitable welds at a voltage of about two volts.

In order to prevent overheating and obtain the most desirable weld, a pulsating current is used which is impressed from the current source in a step by step manner. For example, a sixty cycle A. C. current is used wherein the heating period extends over a thirty-five cycle time period. The current is then turned off for a fifteen cycle time period, then on again for thirty-five cycles, etc., until the interface temperature is raised to the bonding temperature, in this case, above 1900° F. The step by step heating causes a rise in temperature at each pulse of the current which provides more accurate temperature control and prevents local overheating of the parts. In general, on cycles in the order of two to three times, the off cycle will function well. It is obvious that the current pulse cycle, the applied pressure, etc., may all be varied within well known limits to obtain desired results. Also, if the materials to be welded are different than those described or, if the welding electrodes are changed, suitable adjustments may be made as are well known in the art to obtain the desired temperature. In all cases, the only factors which must be carefully controlled are the maximum temperature of the main body and the temperature at the interface, which should be sufficient to create a coextensive weld, and the time of temperature application, namely, an overall time period of two and one-half minutes with a period of not in excess of about one-half minute at the maximum temperature. With these factors properly adjusted, satisfactory welds are possible.

In this connection, I have found that, while an envelope including a non-oxidizing atmosphere disposed around the parts to be welded is generally useful, satisfactory welds can be obtained without such protection and, in fact, it is commercially more desirable due to elimination of equipment and reduction in cost. It is desirable to have the surface of the steel or iron part cleaned, for example, as by sand blasting or chemical cleaning or etching and the surface of the ferrous part free from oxide films. The use of electroplating at the interface may be used but it has been found that welds can be obtained without such plating and, therefore, the use of plating or other protective layers, fluxes, etc., is not necessary.

In general, the ferrous material to be bonded to the strong metal supporting element is disclosed in the aforementioned applications and comprises a porous ferrous network having from about 20 to 25% of graphite dispersed therethrough together with two to six percent molybdenum disulfide. Minor amounts of copper, lead or both, together with ceramic material in small quantities, may also be present to obtain specific frictional characteristics, if desired. Ferrous parts including graphite between 20 and 30% by weight may be welded in the instant method.

The drawings show diagrammatically three types of welding operations. In the first, as shown in Figure 1, three pads of friction material 20 are being bonded to an arcuate supporting element 22. In this instance, three identical copper electrodes 24 are utilized which press identical pads 20 into intimate engagement with the element 22 and a lower electrode 25. The electrode 25 is connected by means of wire 26 to one side of a plural power source 28, while each of the electrodes 24 are connected in parallel by wires 30 to the other side of the power source 28.

The several pads of ferrous material are used in this instance since the supporting element 22 is arcuate in shape and the porous ferrous friction material of the type being welded is quite brittle and is not adapted to bending.

Figure 2:
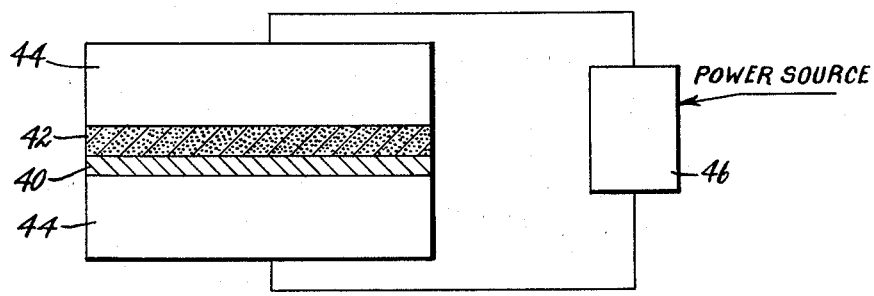
Figure 2 is a diagrammatic view of another type of welding operation wherein a coextensive layer of friction material is welded to a supporting element.

In Figure 2, another operation is shown wherein a steel supporting surface 40 is used upon which a porous element 42 is being bonded. In this instance, identical electrodes 44 are used which are suitably connected to a power source 46. Pressure means, not shown, are provided in all instances for maintaining the electrodes in pressure contact with the parts to be welded.

Figure 3:
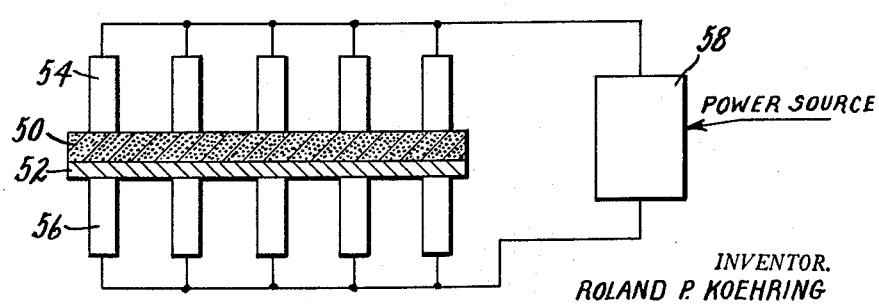
Figure 3 is a modification of the welding operation shown in Figure 2 wherein the coextensive layer of friction material is welded to the supporting element at a plurality of isolated spots.

Figure 3 shows another type of operation wherein a friction element 50 is being bonded to a support element 52. In this case, a plurality of spot welds are used. In order to accomplish the spot welding operation, a plurality of opposed electrodes 54 and 56 are provided which are separated. Electrodes 54 are connected in parallel to one side of a power source 58 while electrodes 56 are arranged in parallel and are connected to the other side of the power source 58.

It is apparent that, while three modifications of the welding procedure are shown in the drawings, other deviations in electrical hook-up and apparatus may be used to accomplish the method claimed herein and, for this reason, it is understood that the drawings are only exemplary of a few of the many ways to accomplish the desired end.

The welding function as described herein is based on the difference in electrical resistance between the several components of the porous ferrous friction facing. The graphite portions of the facing offer high electrical resistance in the order of eight times the resistance of similar ferrous areas at the interface of the element. The ferrous network is of relatively lower resistance and provides a multiplicity of electrical paths of lower resistance through the element. This condition results in restricted paths of high and low resistance at the interface which creates welding temperatures at the interface without a similar general increase in the temperature of the entire element. In fact, the interface will reach a welding temperature while remote portions of the facing or element will be considerably below said temperature. These statements are substantiated by the following tests.

Sintered ferrous material including about 20-22% graphite and 4% molybdenum disulfide (remainder substantially all iron) presents substantially equal areas of iron and graphite at the interface. This is determined on the basis of the density of the two materials in the briquette for the specific percentages used. Since the resistance of graphite is about eight times the resistance of iron, it is apparent that the iron portions of the interface will conduct substantially eight times more current than the graphite portions and will heat up faster because of this current flow whereby welding will result.

This welding temperature is only attained at the interface. This is explained by (1) imperfect contact which raises the resistance at the interface and (2) the mass of the element will tend to maintain the major portion of the element below the interface temperature.

This premise is difficult to prove since it is substantially impossible to measure temperatures in the interface only. However, measurement of the depth of carburization penetration is indicative of temperature conditions and a briquette of the ferrous material set forth above, pressed against a low carbon steel support, was heated in a resistance welding apparatus until the mass of the ferrous material showed a pyrometer reading of 1900° F. A measurement of the carburization on the low carbon steel support showed a penetration of .002 of an inch during a fifty-five second heating cycle. An attempt to carburize a similar piece of low carbon steel with a similar piece of sintered friction material was made where a piece of the sintered friction material was heated up to 1900° F. in a furnace and then a piece of low carbon steel was pressed, under like pressure, into contact therewith for a period of fifty-five seconds wherein the piece of steel was also at 1900° F. This test showed substantially no carburization of the steel from contact with the high carbon sintered material. The results of these two experiments indicates that the interface, during the resistance welding operation, reached a temperature considerably higher than the temperature of the general mass of the sintered article since the carburization penetration is a measure of the temperature involved.

This phenomenon has several beneficial results. It provides for very fast welding, from one-half to two and one-half minutes, it does not overheat the facing material which limits carbon diffusion and, because of the relatively short time of heating, it is less expensive to operate and more useful from a production standpoint. This results in a greatly improved operation and a reduced overall cost over bonding operations carried out by conventional means, for example, in a bonding furnace where it is necessary to heat uniformly the entire assembly and to maintain the heating operation for periods up to one-half hour in order to obtain a bond. In this case, it is necessary to also provide a non-oxidizing atmosphere due to the extended period of heating which would otherwise tend to unduly oxidize the friction facing.

While the embodiments of the present invention as herein disclosed constitute preferred forms, it is to be understood that other forms might be adopted.

What is claimed is as follows:

1. In a method for making a laminated metallic article wherein the laminae are coextensively bonded together at their interface and consist of steel and porous ferrous material containing graphite in substantial quantities wherein the ferrous portions of the porous ferrous laminae are interrupted by substantial graphite inclusions, the steps comprising, superimposing the porous ferrous lamina upon the steel lamina so that their surfaces are contiguous and coextensive, pressing the assembly of the two laminae together, passing a welding current through said assembly for heating the ferrous portions of the porous ferrous laminae at their surfaces contiguous with the steel to a temperature above 1900° F. while maintaining the remainder of the ferrous lamina at a temperature not in excess of 1900° F. for a short time only sufficient to cause a coextensive bond to be obtained between the ferrous portions of the ferrous lamina and the steel and finally cooling the laminated article so formed.

2. In a method for making a laminated metallic article wherein the laminae are coextensively bonded together at their interface and consist of steel and porous ferrous material containing graphite in substantial quantities wherein the ferrous portions of the porous ferrous laminae are interrupted by substantial graphite inclusions, the steps comprising, superimposing the porous ferrous lamina upon the steel lamina so that their surfaces are contiguous and coextensive, pressing the assembly of the two laminae together, progressively heating the assembly by passing a pulsating welding current through the assembly so that the temperature at the interface ultimately reaches a welding temperature while the temperature of the main body of the ferrous lamina does not exceed 1900° F. maintaining said temperature for a short time only sufficient to weld the two laminae together at their interface and then cooling the laminated article so formed.

3. In a method for making a laminated metallic article wherein the laminae are coextensively bonded together at their interface and consist of steel and porous ferrous material containing graphite in substantial quantities wherein the ferrous portions of the porous ferrous laminae are interrupted by substantial graphite inclusions, the steps comprising, superimposing the porous ferrous lamina upon the steel lamina so that their surfaces are contiguous and coextensive, pressing the two laminae together with a pressure in the order of 150 pounds per square inch to hold the laminae in an intimate coextensive relation to one another, passing a pulsating welding current of a density in the order of 600 amperes per square inch at about two volts through the assembly of the laminae in a step by step manner wherein the heating period is in the order of two to three times the nonheatitng period, continuing the pulsations until the temperature is raised to a welding temperature at the interfece between the laminae and is not in excess of 1900° F. in the remainder of the porous ferrous lamina for coextensively welding the laminae at their interface.

4. In a method for welding a sintered ferrous member containing graphite in quantities of from 20 to 30% to a steel supporting member wherein the ferrous portions of the porous ferrous laminae are interrupted by substantial graphite inclusions, the steps comprising, superimposing the ferrous member upon the supporting member so that the contiguous portions are in substantially coextensive contact with one another, pressing the assembly of the two members together, passing a welding current through said assembly for heating the ferrous portions of the ferrous element at the interface to a welding temperature and above the temperature of the remainder of the member, continuing to heat the assembly until a coextensive weld is obtained between the ferrous portions of the porous ferrous member and the support member while maintaining a mass of the porous ferrous member below the welding temperature, and finally cooling the welded assembly.

5. In a method for welding a sintered ferrous member containing graphite in quantities of from 20 to 30% to a steel supporting member wherein the ferrous portions of the porous ferrous laminae are interrupted by substantial graphite inclusions, the steps comprising, superimposing the ferrous member upon the supporting member so that the contiguous portions are in substantially coextensive contact with one another, pressing the assembly of the two members together, intermittently passing a welding current through the assembly for progressively raising the temperature thereof at the interface to a welding temperature while maintaining the temperature of the mass of the porous ferrous member below the welding temperature, maintaining said temperature for a time sufficient to obtain a coextensive weld between the ferrous portions of the porous ferrous member and the supporting member and finally cooling the welded assembly.

6. In a method for welding a sintered ferrous member containing graphite in quantities of from 20 to 30% to a steel supporting member wherein the ferrous portions of the porous ferrous laminae are interrupted by substantial graphite inclusions, the steps comprising, superimposing the ferrous member upon the supporting member so that the contiguous portions are in substantially coextensive contact with one another, pressing the assembed members together with pressures in the order of one hundred and fifty pounds per square inch, intermittently passing a welding current having a density of about six hundred amperes per square inch at two volts through said assembly, wherein the welding cycle is in the order of two to three times the off cycle, continuing the intermittent application of current until the temperature at the interface reaches a welding temperature while the temperature of the mass of the porous ferrous element is not in excess of 1900° F. for providing a coextensive weld between the ferrous portions of the porous ferrous member and the steel member, and finally cooling the welded assembly so formed.

References Cited in the file of this patent
UNITED STATES PATENTS

| | | |
|---|---|---|
| 1,626,774 | Allan | May 3, 1927 |
| 1,756,936 | Bendix | May 6, 1930 |
| 2,046,969 | Redmond | July 7, 1936 |
| 2,178,527 | Wellman | Oct. 31, 1939 |